Aug. 18, 1931.　　　　J. D. COLE　　　　1,819,498
AIR CIRCULATING AND CLARIFYING UNIT
Filed Aug. 22, 1929
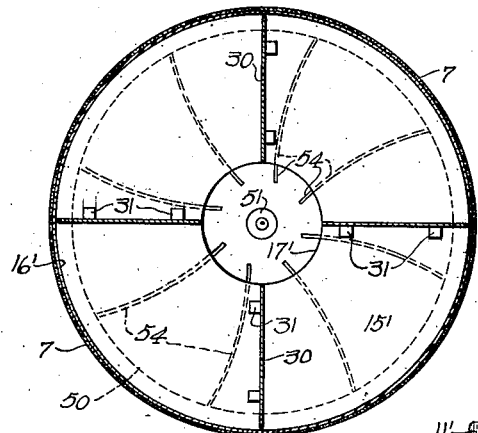
FIG_3
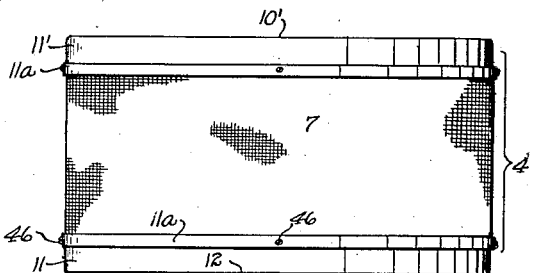
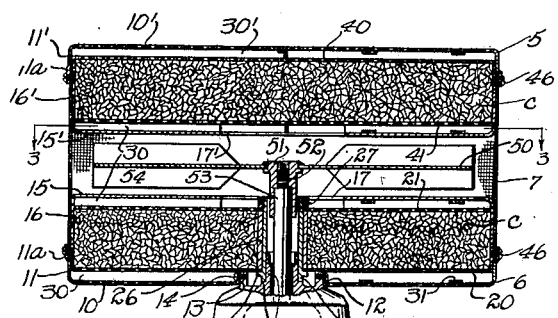
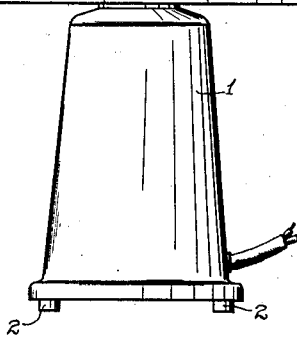
FIG_1
FIG_2
Inventor
James D. Cole
By Bates, Goldrick & Teare
Attorneys Patented Aug. 18, 1931

1,819,498

UNITED STATES PATENT OFFICE

JAMES D. COLE, OF CLEVELAND HEIGHTS, OHIO, ASSIGNOR, BY MESNE ASSIGNMENTS, TO THE A. I. ROOT COMPANY, OF MEDINA, OHIO, A CORPORATION OF OHIO

AIR CIRCULATING AND CLARIFYING UNIT

Application filed August 22, 1929. Serial No. 387,647.

The object of this invention is to provide an improved unit for purifying the air in substantially closed spaces, such for example as a room in a hospital or dwelling.

A further object is to provide an air purifying unit which will be compact, efficient in operation, neat in appearance and which will otherwise completely fulfill the requirements of such a unit.

A further object is to provide a unit which shall be so arranged that it may be easily moved from place to place in a room without likelihood of damage to the unit.

Other objects will become apparent from the following description of the embodiment of the invention shown in the drawings.

The device is particularly applicable to hospital rooms where, ordinarily, expedients such as chemical air treatment are used to deaden unpleasant odors so they will not be noticed. The use of the unit, herein described, obviates the necessity for thus concealing such odors, as will be hereinafter shown. The device is further useful in eliminating poisonous fumes and gases which might otherwise impair the health of the occupants of a room containing such fumes or gases.

Referring to the drawings, Fig. 1 is a side elevation of the preferred form of unit; Fig. 2 is a substantially central cross sectional view of the upper portion of the unit, the base portion being shown in side elevation, and Fig. 3 is a transverse cross sectional view taken substantially along the line 3—3 on Fig. 2.

The unit, as shown, comprises generally, two air filter beds, one above and one below a double acting suction fan, and there is an upright base supporting the beds, the fan and a suitable motor for driving the fan. The filter beds are preferably flattened cylindrical containers, one having a perforated top wall and the other a perforated bottom wall, the containers being arranged to support a suitable amount of granulated carbon or like gas adsorbent material. There are central openings in the walls of the containers adjacent the fan to conduct the clarified air thereto. The arrangement is such that the fan operates to draw air downwardly through the upper bed and upwardly through the lower bed, and to then force it outwardly, clear of the unit, between the two beds.

Referring in detail to the drawings, 1 is a suitable base, shown as provided with cushioned rest members 2 on its lower side. Surmounting the base and supported thereby is a substantially cylindrical casing, designated generally 4, containing the air clarifying or filtering elements and the fan.

The carbon material, as shown, is contained in separate sheet metal receptacles or containers, 5 and 6, each comprising telescoping parts, and the two receptacles are held together and one supported from the other by an outer cylindrical ring 7 preferably of reticulated material, such as wire screen. As shown, the lower receptacle 6 comprises in part an upwardly cupped sheet metal member having a perforated bottom wall 10 and imperforate side walls 11, the wall 10 being upwardly flanged, as at 12, to embrace the reduced upper end 13 of the base. The flanges 12 may be secured to this reduced upper end, as by screws 14. The upper part of the lower receptacle comprises a downwardly cupped member having a top wall 15, a downwardly extending side wall 16 and a central opening 17. The lower edges of the side wall are telescoped by the flange or side wall 11 of the bottom member. The wall 15 is imperforate except for the central opening.

For securing the air clarifying or filtering material in spaced relation to the walls 10 and 15, so as to favor the uniform flow of air through the material, I preferably provide perforated discs 20 and 21, which confine the material between them. The discs may be of any suitable material, such as sheet metal with holes punched therethrough, as shown, or may comprise wire screen. The disc 20 is partly supported on a sleeve 22 which rests on a shoulder 23 on the base 1 and which fits over a short central extension 24 of the base. The sleeve has a flange at 25 on which the disc 20 directly rests. Removably fitting the sleeve 22 above the disc and resting on the disc is a spacer sleeve 26. The disc 21 rests on the upper end of the spacer sleeve and is secured thereagainst by reason of a threaded ring or nut 27 secured to the upper end of the sleeve 22. The sleeve 22 is preferably tightly fitted to the neck 24 of the base, so as to prevent shifting of the parts comprising the lower receptacle away from the base when the unit is inadvertently or purposely inverted. Additional means are provided for spacing the discs 20 and 21 away from the walls 10 and 15. This preferably comprises sheet metal spacer members 30 having outwardly extending short flanges 31 (see Fig. 3) for attachment, as by spot welding, to the respective wall members 10 and 15.

The upper receptacle is very similar to the lower receptacle just described, except that of course no provision has to be made for receiving the fan shaft and for the central support from the unit base. The perforated or reticulated discs corresponding to 20 and 21 are indicated at 40 and 41, these being held within telescoping members, the lowermost being shown as a cupped sheet metal member having wall and flange portions 15' and 16' respectively, and an upper cupped member having walls 10' and 11'—the latter telescoping the flanges 16'. The spacing members 30 between the wall 15' and the disc 41 are substantially the same as those between the wall 15 and disc 21 of the lower receptacle and similar members 30' may be employed between the top wall 10' of the upper receptacle and the disc 40. Likewise, the top wall 10' of the upper receptacle is provided with suitable openings substantially throughout its entire area for the uniform admission of air to the upper bed.

As above stated, the two receptacles 5 and 6 are held together and their component parts secured by an outer ring 7 of material, such as wire screen. This preferably forms a substantially continuous hollow cylinder, the upper and lower edges of which enter outwardly flanged portions 11a on the side wall parts 11 and 11'. The parts of the two receptacles may be fastened tightly together by screws 46 which are inserted through suitable openings in the flange formations 11a and are threaded into the respective inner wall members 16 and 16' so as to clamp the screen 7 tightly at its edges.

The air clarifying or filter material preferably comprises a suitable form of activated carbon, such for example as charcoal made from cocoanut shell and treated in such manner that the gas adsorbent properties are comparatively high. Such carbon material is shown in both receptacles at C.

The fan is located substantially midway between the two receptacles and comprises a central disc 50, supported on a suitable hub 51, which is in turn attached, as by a threaded connection 52, to a drive shaft 53, extending upwardly from the base through the neck 24 and sleeve 22. The fan blades are suitably secured to the disc, and the general shape thereof may be as shown in Fig. 3 at 54. The drive shaft 53 may be the shaft of an armature A shown in broken lines in Fig. 2. Suitable bearings are of course provided in the base for the armature shaft, and of course a suitable field (not shown).

The motor construction may be substantially in accordance with that shown in the prior application of Walter H. Poesse, filed September 3, 1927, and identified as Serial No. 217,458.

Granulated carbon of the kind mentioned will, assuming a substantial quantity, operate to remove fumes and odors from the air for long periods of time. Obviously however, the carbon has to be changed when completely saturated. This is facilitated by the arrangement herein shown and above described. The upper container 5 is serviced to remove and replace the carbon simply by taking off the top closure member 10'—11', as by removing the screws 46, lifting off the top disc 40 and dumping out the carbon. To service the lower receptacle 6, the upper receptacle, and with it the screen 7, if first removed, the lower receptacle screws 46 being, of course, taken out, or at least disengaged from the wall member 16 of the lower receptacle. The fan is then unscrewed from the shaft, the annular nut 27 removed and the base inverted, permitting the part 15—16 and the carbon contained thereby, to be slipped out of place. The manner of removal and replacement of the carbon after this is obvious; likewise, the re-assembly of the entire structure.

It will be seen from the above, that as soon as the motor is started, air will pass downwardly through the openings in the wall 10', by reason of the sucking action of the fan, and the air which passes through the granulated carbon will be purified thereby and returned through the space between the walls 15' and disc 41 to the opening 17', where it will be thrown outwardly by the fan through the reticulated wall 7.

Likewise, it will be seen that air will be simultaneously drawn into the lower receptacle through the perforated wall 10 and pass to the fan in a similar manner at the central opening 17 of the wall member 15, this air being then thrown outwardly by the lower fan blades 54 through the reticulated wall 7. The general result of such operation is to maintain a gentle circulation of air in the room, thus facilitating ventilation as well as completely clarifying all the air that passes through the unit.

I claim:

1. Mechanism of the kind described, wherein there is a casing, a fan in the casing, means for driving the fan, an air clarifying elements at each side of the fan, the parts being adapted and arranged in such manner that the fan operates to simultaneously draw air from the top and bottom of the casing through both clarifying elements and to return the clarified air through the central portion of the casing to the room containing the casing.

2. Mechanism of the kind described, comprising a casing, air flow inducing means disposed in the casing, spaced air clarifying means within the casing disposed at opposite sides of the air flow inducing means, said air flow inducing means being arranged in such manner that it will simultaneously draw air from the top and bottom of the casing through both clarifying means and project the same into the room containing the casing, each particle of air passing through but one of the air clarifying means.

3. Mechanism of the kind described, comprising an upright base, a casing surmounting and supported by the base, a motor contained in the base, a shaft driven by the motor and projecting upwardly therefrom into the casing, a fan driven by the shaft and arranged to simultaneously draw air upwardly and downwardly, clarifying air material and means to support the air clarifying material within the casing above and below the fan in the path of air induced to flow by the fan as aforesaid.

4. Mechanism of the kind described, comprising an upright base, a casing surmounting and supported by the base, a motor contained in the base, a shaft driven by the motor and projecting upwardly therefrom into the casing, a fan driven by the shaft and arranged to draw air from two opposite directions and discharge such air outwardly, air clarifying material and means to support said air clarifying material within the casing above and below the fan.

5. Mechanism of the kind described, comprising separate receptacles, air clarifying material within said receptacles, means positioned between said receptacles and arranged to simultaneously cause air to flow through both receptacles, and a supporting member surrounding the two receptacles and securing them together, said member having a reticulated wall providing passage for air induced to flow by the said means.

6. In an air clarifying unit, two telescoping substantially cylindrical members, one member having an end wall provided with air inlet means substantially throughout the entire area of the wall, the other member having an end wall which is substantially imperforate except for a central opening, air clarifying material, means to retain said air clarifying material between and in spaced relation to both walls, and a suction fan disposed adjacent the said central opening, there being means to support the fan in substantially fixed relation to the central opening, and means on the supporting means to drive the fan.

7. Mechanism of the kind described, comprising air clarifying material, spaced receptacles for said air clarifying material, a fan positioned between said receptacles, and means to drive the fan, supporting means connecting the two receptacles and providing an air outlet from between the receptacles, the fan comprising a central imperforate disc with vane members on both sides directed toward respective receptacles, both receptacles having a wall adjacent the vane members which is substantially imperforate except for a central opening, whereby rotation of the fan will cause air to be simultaneously drawn through the receptacles.

In testimony whereof, I hereunto affix my signature.

JAMES D. COLE.